United States Patent

[11] 3,583,104

| [72] | Inventors | Robert P. Petroske<br>Waukesha;<br>Donald R. Meyer, Ozaukee, both of, Wis. |
|---|---|---|
| [21] | Appl. No. | 789,785 |
| [22] | Filed | Jan. 8, 1969 |
| [45] | Patented | June 8, 1971 |
| [73] | Assignee | John Oster Manufacturing Co.<br>Milwaukee, Wis. |

[54] ELECTRIC KNIFE SHARPENER
19 Claims, 9 Drawing Figs.

[52] U.S. Cl. .................................................. 51/102
[51] Int. Cl. ................................................... B24b 3/54, B24b 9/00
[50] Field of Search ........................................ 51/80.1, 86.1, 102, 109.1, 111 BRR, 128, 214, 80.1 A; 248/37.3, 37.6; 211/60 K; 30/138, 139

[56] References Cited
UNITED STATES PATENTS

| 2,522,942 | 9/1950 | Gillen ........................... | 51/128 |
| 2,866,303 | 12/1958 | Gunderson ..................... | 51/241 |
| 3,034,264 | 5/1962 | McMaster ..................... | 51/102 |
| 3,071,899 | 1/1963 | Hicks et al. .................... | 51/128 |

*Primary Examiner*—Othell M. Simpson
*Attorney*—George R. Clark

ABSTRACT: An electric knife sharpener having a housing defining a front chamber containing an electric motor and grinding means driven by said motor and defining a rear chamber into which a knife blade can be inserted when the knife is being supported and stored by a rack means formed with said housing.

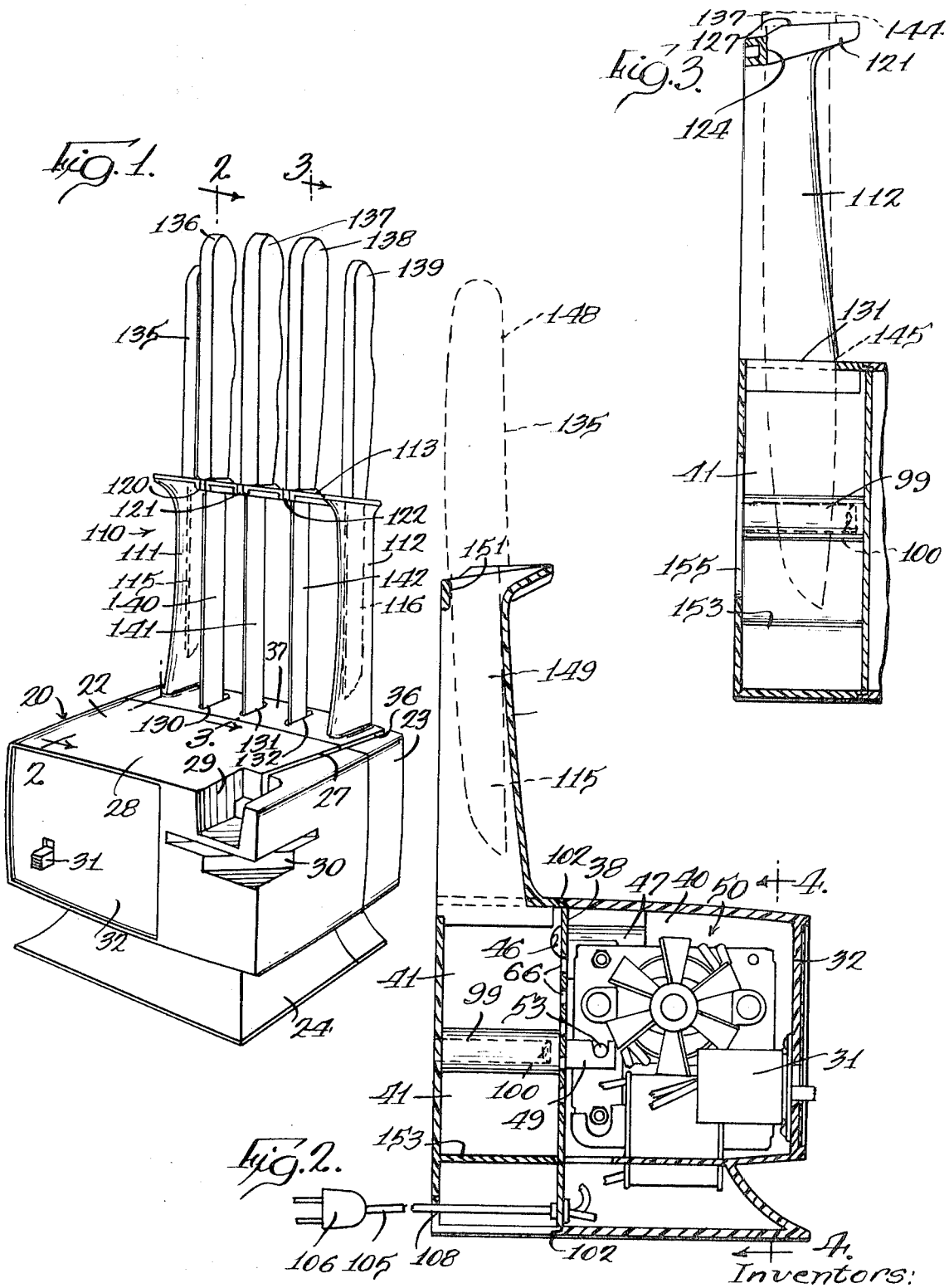

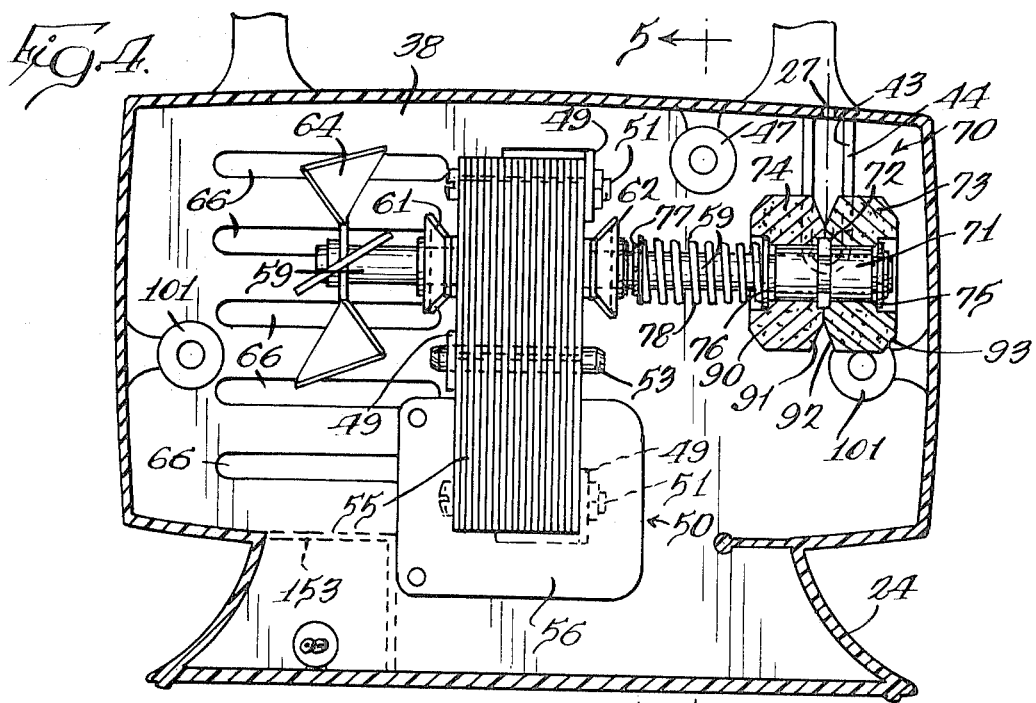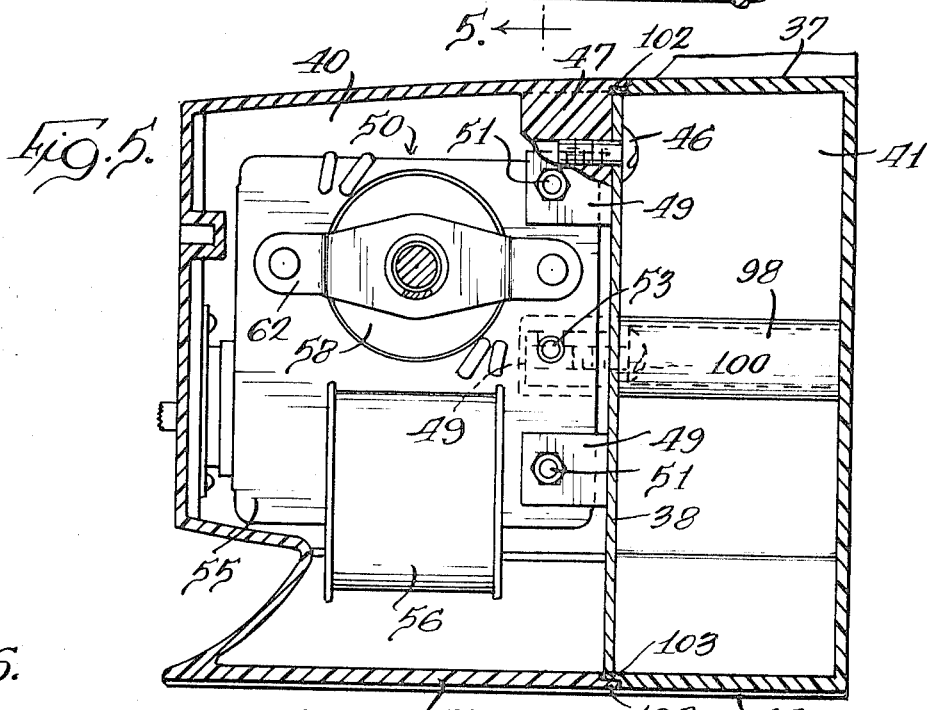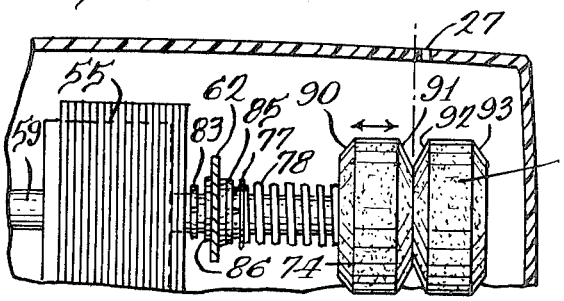

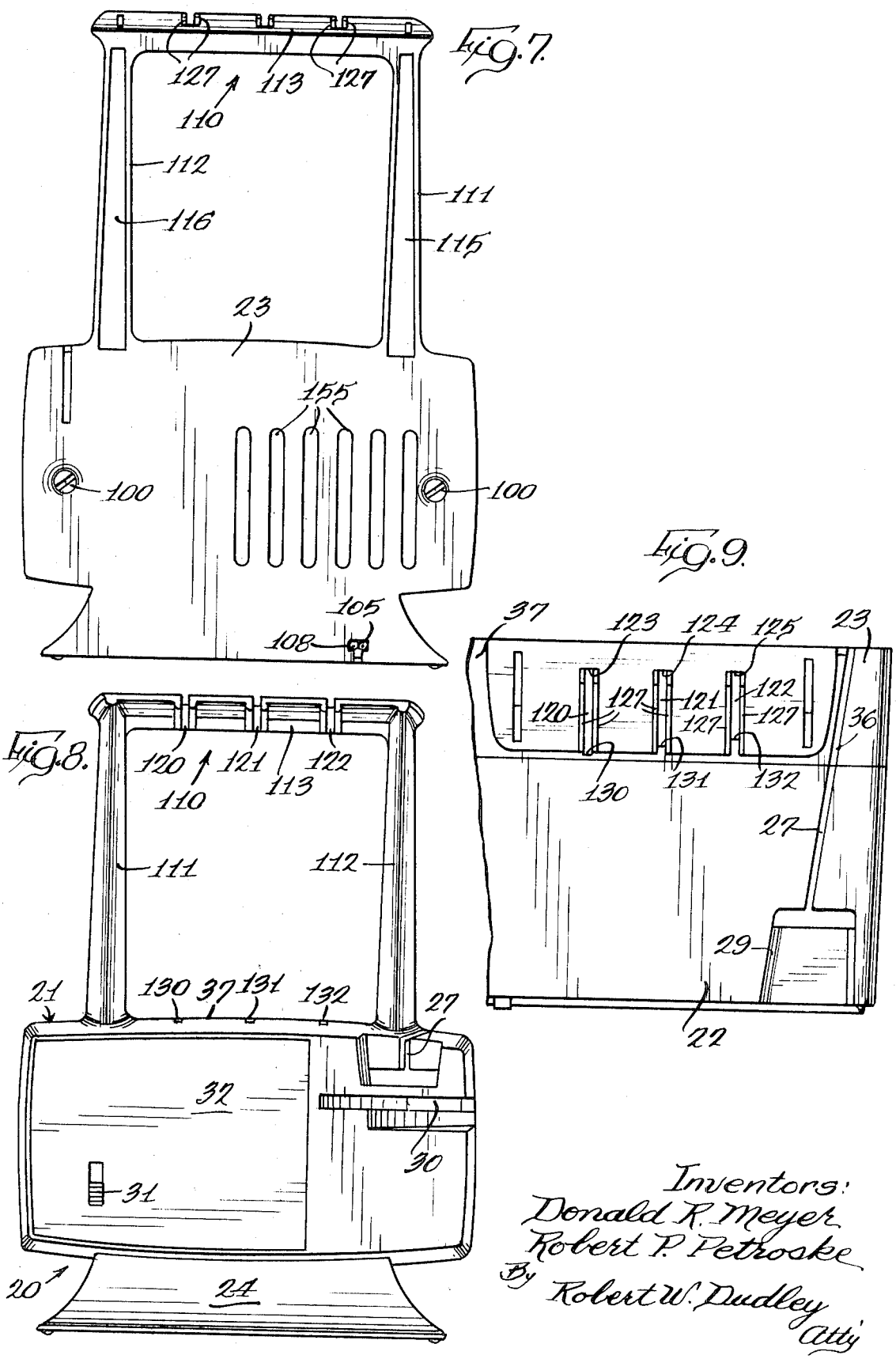

ELECTRIC KNIFE SHARPENER

BACKGROUND OF THE INVENTION

The present invention relates to knife sharpening devices, and more particularly to knife sharpeners having a housing enclosing an electric motor which drives grinding wheel means and defining guide means for presenting knife blades to the grinding wheel means for sharpening.

In recent years, electric knives have become popular because of their ability to provide power for assisting in the many food cutting operations performed in the home. However, many people still prefer to use regular knives due to their light weight and ease in manipulation. Moreover, regular knives are made in many different sizes and shapes each of which is suited to different cutting tasks. In most homes, numerous cutlery items are usually found.

While it is well recognized that electric knife sharpeners which are normally used on the kitchen counter top are most desirable for quickly and properly sharpening a knife, their popularity has suffered because only a limited number of electrically operated appliances can conveniently be maintained on the kitchen counter top due to the limited space available and the priority for a large work area. Many people have reasoned that an electric knife sharpener will not be used frequently since it is too much bother to remove this device from its place of storage such as a kitchen cabinet, connect it to an electrical outlet and then sharpen a knife with the realization that this appliance must then be disconnected from the outlet and returned to its storage place. The logical conclusion of this reasoning is that this type of appliance is not worthwhile due to its infrequent usage because of the lack of accessibility. Accordingly, it would be desirable to provide an electric knife sharpener which is highly efficient in sharpening cutlery and which is so closely associated with the knives which are most frequently used in the kitchen that the unit would be used sufficiently enough to keep it permanently on the kitchen counter top.

Another exemplary feature for an electric knife sharpener in an arrangement which affords a means whereby the relationship between the knife guiding means which is formed as a part of the housing and the grinding means for sharpening a knife blade is not critical. Naturally, the most single important criteria for a knife sharpener is that it produces a sharp, well-shaped cutting edge on the cutlery. It is appreciated by those skilled in this art that a two-wheel grinding system is particularly adept at producing a good cutting edge. However, for the proper cutting edge to be ground on the knife blade, it is necessary that the housing guide for the knife blade be in proper spacial relationship with the grinding wheels. Therefore, it is highly advantageous to have an electric knife sharpener which is easily and inexpensively manufactured and which is capable of grinding an accurate cutting edge on the cutlery, and this unit should be designed in such a manner that the accumulation of assembly tolerances is not critical to the spacial relationship between the knife guiding means and the grinding wheels.

SUMMARY OF THE INVENTION

The invention relates to an electric knife sharpener having a housing which encloses an electric motor mounted on a vertically disposed plate which divides the housing into a front and rear section. The front housing section defines a knife guiding means for presenting a knife blade to grinding means secured to the motor shaft. The rear housing section includes rack means for supporting and storing knives.

To facilitate the alignment between the housing guide means and the grinding means for proper knife sharpening, the motor shaft is longitudinally movable. The engagement between the knife blade and both the guide means and grinding means forces the shaft longitudinally into correct alignment. It is an object of the present invention to provide an improved electric knife sharpener which is easily and inexpensively manufactured.

It is a further object of the present invention to provide an improved electric knife sharpener having means for supporting and storing knives.

Still another object of the present invention is to provide an improved electric knife sharpener arranged in such a manner that the assembly relationship between the grinding means and the knife guiding means is not critical.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWINGS

FIG. 1 is a perspective view of an improved electric knife sharpener embodying our invention with knives stored thereon;

FIG. 2 is a side sectional view taken substantially along line 2–2 of FIG. 1 with the electric power cord not shown in its entirety and a knife depicted in broken lines in a storage position;

FIG. 3 is a fragmentary sectional view taken substantially along line 3–3 of FIG. 1 with a knife in the storage position partially shown in broken lines;

FIG. 4 is an enlarged fragmentary sectional view taken substantially along line 4–4 of FIG. 2 assuming that FIG. 2 shows the complete device;

FIG. 5 is a fragmentary side sectional view taken substantially along lines 5–5 of FIG. 4;

FIG. 6 is a fragmentary side elevational sectional view looking toward the rear of the knife sharpener and disclosing the motor with the grinding wheels mounted thereto;

FIG. 7 is a rear elevational view of the subject device with the power cord broken away;

FIG. 8 is a front elevational view of the knife sharpener; and

FIG. 9 is a top plan view thereof with the electric power cord deleted.

DESCRIPTION OF THE PREFERRED EMBODIMENT

Referring now to the drawing, there is shown in FIG. 1 an electric knife sharpener designated generally by the reference numeral 20. The knife sharpener 20 comprises a housing 21 having a front section 22 and a rear section 23 both of which are somewhat cup-shaped with their opened ends in opposed relationship. Preferably, the housing 21 is molded from a suitable plastic material, such as a styrene. As con be seen in FIG. 1, the housing 21 is formed with a pedestal portion 24 which is adapted for supporting the appliance when it is placed on a horizontal surface such as a kitchen counter top. The front housing section 22 is molded with a roof wall 28 defining a knife blade receiving slot 27 which angles across the roof. At the forward end of the knife slot 27, is a clearance recess 29 for permitting nearly the full presentation of a knife blade to the grinding means disclosed hereinafter. Positioned below the clearance recess 29 in the front housing section 22 is a scissor sharpening slot 30 which is generally horizontally disposed at the front corner of the housing section. Mounted to the front housing section 22 is an electrical switch 31 for selectively energizing the knife sharpener and may be an inexpensive single-pole single-throw slide switch. Preferably, overlying the electrical switch 31 is a suitable escutcheon indicated by the reference numeral 32.

In order for a knife blade to be fully inserted into the front housing section blade slot 27, the rear housing section 23 is formed with roof wall 37 defining a knife blade clearance slot 36 which is in alignment with the slot 27. Sandwiched between the front and rear housing sections 22 and 23 is a vertically disposed plate 38 which is preferably fabricated from sheet steel. As can be seen in FIG. 2, the plate 38 divides the housing 21 into a front chamber 40 and a rear chamber 41. The plate 38 has a peripheral configuration which is complementary to both the front and rear housing sections so that the front and rear chambers 40 and 41 respectively, are completely separated from each other. To allow a knife blade to be inserted into knife slot 27, the plate 38 is formed with a vertically extending clearance opening 43 into which is placed a plastic electrically insulating bushing 44 preventing the engagement of a knife blade with the metallic plate 38 for insuring that the sharpened knife edge is not inadvertently dulled by contact with a metallic part. Locking the plate 38 to the front housing section 22 is a single screw 46 which passes through the plate into the front chamber 40 and is in threaded engagement with front housing section boss 47. As can be seen in FIGS. 2 and 5, the plate 38 is formed with three spaced mounting tabs 49 which project toward the front housing section 22.

Mounted to the plate 38 is an electric motor 50 which is preferably of the shaded pole type. The mounting of the motor to the plate is accomplished by means of bolts 51 which pass through the motor 50 and lock it to the upper and lower tabs 49 and also by a motor pin 53 which is received in the centrally disposed mounting tab 49 as viewed in FIGS. 4 and 5. The electric motor 50 includes a stator 55 having a coil 56 for producing a magnetic field in a manner well known in the art and a rotor 58 mounted on rotor shaft 59 which is rotatably supported by bearing brackets 61 and 62 which are positioned on opposite sides of and rigidly attached to the stator 55. Preferably, the brackets 61 and 62 are fabricated by being cast of zinc so that they form a natural bearing material for use in connection with the rotor shaft 59 which is preferably made from a hardenable steel. Disposed at one end of the rotor shaft 59 is fan 64, the rotation of which induces cooling air to flow past the motor through a plurality of horizontally extending spaced cooling air slots 66 defined in the plate 38.

Attached to the other end of rotor shaft 59 is grinding wheel assembly 70 including a plastic sleeve 71 formed with a central annular collar 72 and on each side of which is disposed a grinding wheel 73 and 74. Both of the grinding wheels are rigidly attached to the sleeve 71 by means of a press fit therebetween, and the sleeve 71 is slidably mounted on the rotor shaft 59. Positioned inwardly from the grinding wheel assembly 70 and anchored to the shaft 59 is a retaining clip 77. A clutch spring 78 is carried by the shaft 59 between the retaining clip 77 and a washer 76 which bears against the grinding wheel 74 whereby the grinding wheel assembly 70 is biased against retaining clip 75 to keep the assembly at a fixed longitudinal position with respect to the shaft, and the frictional engagement between the spring and the wheel causes the grinding wheel assembly to rotate with the rotor shaft 59 unless an excessive torsional force is exerted upon the grinding wheel assembly causing it to either stop or rotate at a slower speed than the rotor shaft. With this assembly relationship, the clutch spring 78 prevents the grinding wheel assembly 70 from burning the cutting edge of a knife blade when the knife blade is pressed with too great a pressure thereon.

In accordance with the present invention, two spaced abutment means, one of which s clip 77 and the other which is retaining clip 83, are anchored to the rotor shaft 59 and are disposed on opposite sides of bearing bracket 62 as can be seen in FIGS. 4 and 6. To lessen the friction between the retaining clips 77 and 83 and the bearing bracket 62, there is positioned immediately adjacent to each side of the bearing bracket on shaft 59 suitable thrust washers 85 and 86 which are not secured to either the retaining clips or bearing bracket. With this construction, the rotor shaft 59 is permitted considerable longitudinal movement (shown by arrow heads in FIG. 6) and in the preferred embodiment the longitudinal movement of the shaft is approximately 0.110 inches. The amount of longitudinal movement of the shaft 59 is governed by the distance between the retaining clips 77 and 83 less the thickness of the thrust washers and the bearing bracket 62. Therefore, as viewed in FIG. 6, the rotor shaft 59 can move to the left until the thrust washer 85 and clip 77 engage with the bearing bracket 62. Correspondingly, the rotor shaft 59 can move to the right until the retaining clip 83 forces the thrust washer 86 against the bearing bracket 62. Even though there is substantial longitudinal movement permitted, the motor 50, when energized, produces a magnetic field which tends to hold the rotor 58 in a fixed longitudinal position. Thus, when no external force is exerted upon the rotor shaft 59 or the grinding wheel assembly 70, the rotor revolves with very little longitudinal movement of rotor shaft 59.

With further reference to the grinding wheel assembly 70, the grinding wheel 73 and 74 are formed with peripheral chamfers 90, 91, 92 and 93, as can be conveniently seen in FIG. 6. Inasmuch as the grinding wheels are in abutting relationship, the juxtaposition chamfers 91 and 92 form an included angle of approximately 44°. As mentioned hereinbefore, the front housing section 22 is formed with an angularly disposed knife blade slot 27 which slot is disposed approximately above the grinding wheel assembly 70. To obtain a good grinding relationship on both sides of the knife blade edge, it is preferred that the slot 27 is angled at approximately 6½° with respect to an imaginary line normal to the rotor shaft 59. When a knife blade is inserted into slot 27, the blade edge contacts grinding wheel chamfers 90 and 91 at points spaced from the apex of the junction between the chamfers in a manner which is well understood in the art. In order to sharpen properly, the grinding wheel chamfers 90 and 91 must be correctly spaced with respect to the slot 72. Since there are many separate elements which govern the relationship between the slot 27 and the grinding wheel assembly 70 and the accumulation of assembly tolerances for these elements would be extremely difficult to control, the grinding wheel assembly 70 is permitted to move into correct alignment with the slot 27 due to the fact that the rotor shaft 59 is permitted to move longitudinally. Thus, as a knife blade edge contacts the chamfers 91 and 92 and is also in contact with housing roof 28 which defines the slot 27, the knife edge moves the grinding wheel assembly 70 along with rotor shaft 59 to a position of correct alignment. After the knife blade is withdrawn from the slot 27, the rotor shaft 59 will again assume a longitudinal position governed by the magnetic coupling between the stator 55 and the rotor 58.

When it is desired to use the knife sharpener 20 to sharpen a pair of scissors, they are presented to the scissor slot 30 which guides the scissor blade to the proper angle of engagement with the grinding wheel chamfer 93. As the scissor blade is moved inwardly, the engagement with the chamfer slot 93 forces the rotor shaft 59 to move inwardly until the thrust washer 85 is forced against the bearing bracket 62 by retaining clip 82. Thus, it may be seen that the grinding wheel assembly 70 is movable to correctly sharpen either a knife blade or a pair of scissors.

For the purpose of locking the rear housing section 23 to the front housing section 22, the rear section is molded with two spaced, inwardly extending wells 98 and 99 at the bottom of which are fasteners 100 which are in threaded engagement with mounting bosses 101 in front housing section 23. It should be noted that the housing sections interlock with each other by means of a front housing sectional peripheral tongue 102 engaging with rear housing section peripheral recess 103. The interlocking of the two housing sections is particularly advantageous in providing support for the front housing roof wall 28 which would otherwise be easily deflected inwardly due to the discontinuity caused by the knife blade slot 27. With this construction roof walls 37 and 28 are interlocked together and both are supported by the vertically extending steel plate 38.

Supplying power to the motor 50 is an electric cord 105 having a plug 106 at its outer end. The power cord 105 is attached at its inner end to the motor 50 and extends through the rear chamber 41 before exiting through an opening 108 defined in the lower portion of the rear housing section 23.

In order to provide storage for knives which are preferable of the shapes used with great frequency in the kitchen, the rear housing section 23 includes an integral inverted U-shaped rack 110 having two upwardly extending hollow legs 111 and 112 with an interconnecting bight portion or wall 113 spaced a considerable distance above the rear housing section roof wall 37. Both the leg 111 and 112 are hollow throughout their entirety so that there are defined rearwardly open passageway 115 and 116, respectively extending from the top of the legs to the rear chamber 41. The bight portion 113 is angled upwardly toward the front of the electric knife sharpener, as seen in FIG. 3, and defines three central slots 120, 121 an 122, as seen in FIG. 9, which extend through the front of the bight portion and terminate at rear edges 123, 124 and 125, respectively. Each of these slots is formed with upwardly extending lips 127 on each side thereof which lips are adapted for engaging and supporting a knife handle. In vertical alignment with the slots 120, 121 and 122 are three complementary slots 130, 131, 132, defined in the rear housing section wall 37 to provide access to rear chamber 41. Five knives, 135 through 139, are shown in FIG. 1 in their storage position on the U-shaped rack 110. It is believed that these knives are representative of those which are normally found in the kitchen. The middle three knives, namely, knives 136 through 138 have relatively long blades 140 through 142 which extend through slots in the bight portion 113 and through the complementary slots in the rear housing section wall 37 so that the remote ends of the blades are disposed within the rear chamber 41. As can be seen in FIG. 3, the rear chamber 41 is relatively long in the vertical direction so that there is provided considerable room for different knife lengths. Turning our attention to FIG. 3, it may be seen that as knife 137 having a handle 144 is placed in storage position so that its blade 141 passes through slot 121 in the bight portion 113 and also passes through slot 131 in the wall 37, the knife handle 144 rests on the bight portion lip 127 adjacent to the slot 121. Inasmuch as the bight portion and lips 127 are upwardly inclined, the knife handle 144 slides rearwardly until the knife blade abuts against the slot end 124 which causes the blade to rotate in a counterclockwise direction until the lower portion of the blade abuts against a front edge 145 of slot 131. Accordingly, the knives 136 through 138 are held in a similar manner so that they are arrayed in parallel relationship and are supported by the handles engaging the bight portion lip 127 with the blades contacting the rear edges of the bight portion slots and the forward edges of the rear housing section slots.

Since it is desired to support in rack 110, knives of various sizes and since short bladed knives are frequently used in the kitchen, short bladed knives such as 135 and 139 can be conveniently stored in the legs 111 and 112 as illustrated in FIG. 2. It should be noted that knife 135 having a handle 148 and a blade 149 is disposed in leg 111 so that the handle 148 is supported by the lips 127 at the top of the leg while the blade 149 passes downwardly within the passageway 115 and rotates counterclockwise until the top of the knife blade rests against the rear of the passageway at numeral 151 and the lower portion of blade contacts the forward side of the passageway whereby the knife is supported at approximately the same disposition as those knives supported in the center of the bight portion 113.

To protect the electric power cord 105 from coming into contact with a knife blade which passes into rear chamber 41 while in the storage position, the rear housing section 23 is formed with an integral shield wall 153 which extends over and around the power cord 105 as seen in FIGS. 2 and 4. In order for cooling air to reach the motor 50 through plate slots 66, the rear housing section 23 is molded with a plurality of vertically extending air inlet openings 155 which are opposite the plate openings 66 and, consequently, the air inlet openings 155 are arranged to run normal to the slots 66 thereby preventing the accidental insertion of a knife blade through those air openings into the front chamber 40 containing the grinding wheel assembly 70 and the motor 50. It should also be appreciated that the cooling air slots 66 in plate 38 are oriented so that a knife blade entering rear chamber 41 through slots 130 to 131 cannot pass through the cooling air slots 66.

The operation of the electric knife sharpener 20 is apparent from the above discussion. However, it should be appreciated that the subject knife sharpener lends itself to inexpensive and simple assembly because the motor 50 which carries the grinding wheel assembly 70 can be first assembled to the plate 38 after which it is merely necessary to enclose the plate 38 and the parts attached thereto by the front housing section 22 and the rear housing section 23 by means of a few screws. The spacial relationship between the grinding wheel assembly 70 and the front housing knife slot 27 and scissor slot 30 is not critical because the rotor shaft 59 is permitted to move longitudinally when the grinding wheel assembly 70 comes into contact with either a knife blade or scissors. Furthermore, the substantial longitudinal movement of the rotor shaft does not prevent the grinding wheel assembly 70 from rotating smoothly when not contacted by a cutlery blade due to the magnetic coupling between the stator 55 and the rotor 58. The usefulness of this appliance is greatly enhanced by its ability to store knives which are easily reached by the user and which can be easily stored in the knife sharpener rack 110. The ready access to the knives provides a great convenience for the user since these knives which may be of a variety of shapes are so frequently used in the preparation of meals. Thus, it is now practical to have this appliance permanently kept on the kitchen counter top and the user may, if so desired, sharpen the knife with each use thereof, because such a procedure can be quickly accomplished within a few seconds without the necessity of taking a knife sharpener from some storage position, connecting it to an outlet and then replacing it back to its storage position. Due to the design of the rack 110, various shaped knives may be conveniently stored thereon and from time to time, knives of different shapes can replace those which were stored in the rack. With this arrangement, the subject appliance does not lose its usefulness once the knives have become badly damaged since new knives of the same or different shapes may be substituted therefor.

While there has been shown and described one embodiment of the present invention, it will be apparent to those skilled in the art that numerous changes and modifications may occur and it is intended in the appended claims to cover all such changes and modifications which fall within the true spirit and scope of the present invention.

What I claim as new and desire to be secured by Letters Patent of the United States is:

1. An electric knife sharpener comprising a front housing section having a rearwardly facing opening, a rear housing section having a frontwardly facing opening, an electric motor mounted on a vertically disposed plate with said plate positioned between said housing sections and closing said openings so that front and rear chambers are defined, said motor being positioned within said front chamber and being provided with a horizontally extending rotor shaft on which is carried grinding wheel means, said front housing section formed with a knife receiving slot in its upper wall and said slot positioned over said wheel means, means fastening said housing sections and said plate together.

2. The electric knife sharpener of claim 1 wherein said rear housing section is formed with rack means for supporting and storing knives.

3. The electric knife sharpener of claim 2 wherein said rack means includes a generally horizontal wall having at least one slot for receiving a knife blade and said wall spaced above said rear chamber, said rear housing section formed with at least one slot whereby a knife can be supported with its blade passing through said rack means wall slot and rear housing section slot into said rear chamber.

4. The electric knife sharpener of claim 1 wherein said motor includes a stator for generating a magnetic field and a rotor on said rotor shaft wherein said rotor is acted upon by the magnetic field to produce rotation thereof, means permitting substantial longitudinal movement of said rotor shaft with respect to said stator so that as the knife blade is inserted through said front housing section wall slot and engages said grinding wheel means said rotor shaft is permitted to move longitudinally whereby said front housing section wall slot is in proper sharpening alignment with said grinding wheel means.

5. The electric knife sharpener of claim 4 wherein said rotor shaft is provided with two longitudinally spaced abutment means, said motor including bearing means rotatably supporting said rotor shaft and disposed between said abutment means thereby permitting longitudinal movement of said rotor shaft to the extent that said bearing means can slide with respect to said rotor shaft between said abutment means.

6. The electric knife sharpener of claim 1 wherein said plate is formed with a plurality of motor cooling air slots, said rear housing section having a plurality of motor cooling air slots so that cooling air can pass through said rear chamber into said front chamber, said plate slots and said rear housing section cooling air slots extending normal to each other whereby a knife blade cannot be inserted through said slots into said front chamber.

7. The electric knife sharpener of claim 3 wherein said motor includes an electric power cord which extends through said rear chamber, said rear housing section provided with wall means shielding said cord for preventing the contact of said cord with a knife blade inserted into said rear chamber.

8. The electric knife sharpener of claim 1 wherein said front and rear housing sections are formed to interlock whereby said front housing section upper wall is supported against inward deflection by said interlocking.

9. The electric knife sharpener of claim 8 wherein said vertical plate is disposed adjacent the interlocking of said sections for supporting said upper wall.

10. An electric knife sharpener comprising a housing enclosing an electric motor having means for rotatably supporting grinding means, a base for supporting said housing on a horizontal surface, said housing being provided with slotted walls forming guiding means for presenting a knife blade to said grinding means which is positioned within said housing, said housing including upstanding rack means extending vertically from the motor enclosing portion of said housing, said rack means supporting and storing knives in a generally vertical position with the handles positioned uppermost, said rack means includes a generally horizontal upper wall formed with slot means for receiving a plurality of knife blades, said motor enclosing portion of said housing being provided with slot means below said wall slot means whereby a knife can be supported by the blade extending through both slot means into said motor enclosing portion of said housing and the knife handle resting on said upper wall.

11. The electric knife sharpener of claim 10 wherein the portion of said upper wall adapted for contacting the knife handle is upwardly inclined causing the knife blade to slide to the end of said upper wall slot means and causing the knife blade to pivot so that the knife blade contacts one end of said housing slot means whereby the disposition of the knife with respect to said housing is controllable.

12. An electric knife sharpener comprising a housing enclosing an electric motor having means for rotatably supporting grinding means, said housing provided with guiding means for presenting a knife blade to said grinding means for sharpening, said housing including an upwardly extending rack means for supporting and storing knives in a generally vertical position, said rack means has an inverted U-shaped configuration with the bight portion provided with a plurality of slots for receiving knife blades, said housing formed with a plurality of slots below and in alignment with said bight portion slots so that knives are supportable by inserting the knife blades through said slots into housing with the knife handles resting on said bight portion, said U-shaped rack means having two-spaced vertically extending legs which are hollow and have an upwardly facing opening whereby knives with relatively short blades can be supported by said legs when the knife blade is inserted into said hollow legs.

13. An electric knife sharpener comprising a housing enclosing an electric motor having means for rotatably supporting grinding means, said housing provided with guiding means for presenting a knife blade to said grinding means for sharpening, said housing including an upwardly extending rack means for supporting and storing knives in a generally vertical position, said rack means includes a hollow vertically extending leg having an upwardly facing opening and a generally horizontal wall extending away from said leg near the top thereof, said upper wall formed with at least one slot for receiving a knife blade for storing the knife on said wall, said hollow leg disposed for receiving and storing a knife wherein a knife supported by said upper wall is parallel to a knife supported by said leg.

14. The electric knife sharpener of claim 12 wherein said electric motor is supported on a vertically extending plate which divides said housing into a front and rear chamber wherein said motor and said grinding means are disposed in said front chamber, the knife blades being insertable into said rear chamber, said plate preventing the knife blades from contacting said motor and said grinding means while the knives are being supported by said rack means.

15. The electric knife sharpener of claim 14 wherein said plate is formed with a plurality of cooling air slots which are oriented so that a knife blade entering the rear chamber through said housing slot means cannot pass through said cooling air slots.

16. An electric knife sharpener comprising a housing enclosing an electric motor having a stator for generating a magnetic field and a rotor supported on a rotor shaft for rotation under the influence of the magnetic field, means permitting substantial longitudinal movement of said rotor shaft with respect to said stator, grinding means secured to said shaft, said housing provided with guiding means for presenting a knife blade to said grinding means for sharpening whereby the contact of the knife blade with said guiding means and said grinding means forces said shaft to assume a longitudinal position so that said guiding means and said grinding means are in spacial relationship for proper knife sharpening, the magnetic field generated by said stator causes said rotor to rotate without excess longitudinal movement when a knife blade is not in contact with said grinding means.

17. The electric knife sharpener of claim 16 wherein said grinding means includes angled surfaces which are adapted for engagement with the knife blade so that the contact therebetween can easily force said shaft to move longitudinally.

18. The electric knife sharpener of claim 16 wherein said means including two longitudinally spaced abutments secured to said rotor shaft, bearing means secured to said stator and rotatably supporting said shaft between said abutments whereby the length of longitudinal movement of said shaft is determined by the relative movement of said bearing means between said abutments.

19. The electric knife sharpener of claim 18 wherein said housing is formed with a scissor guide for presenting a pair of scissors to one end of said grinding means remote from said bearing means, the pressure of the scissors against said grinding means one end causes said shaft to move longitudinally until the abutment closer to said grinding means comes to said bearing means, a thrust bearing carried by said shaft and positioned between said abutment closer to said grinding means and said bearing means.